Patented May 2, 1950

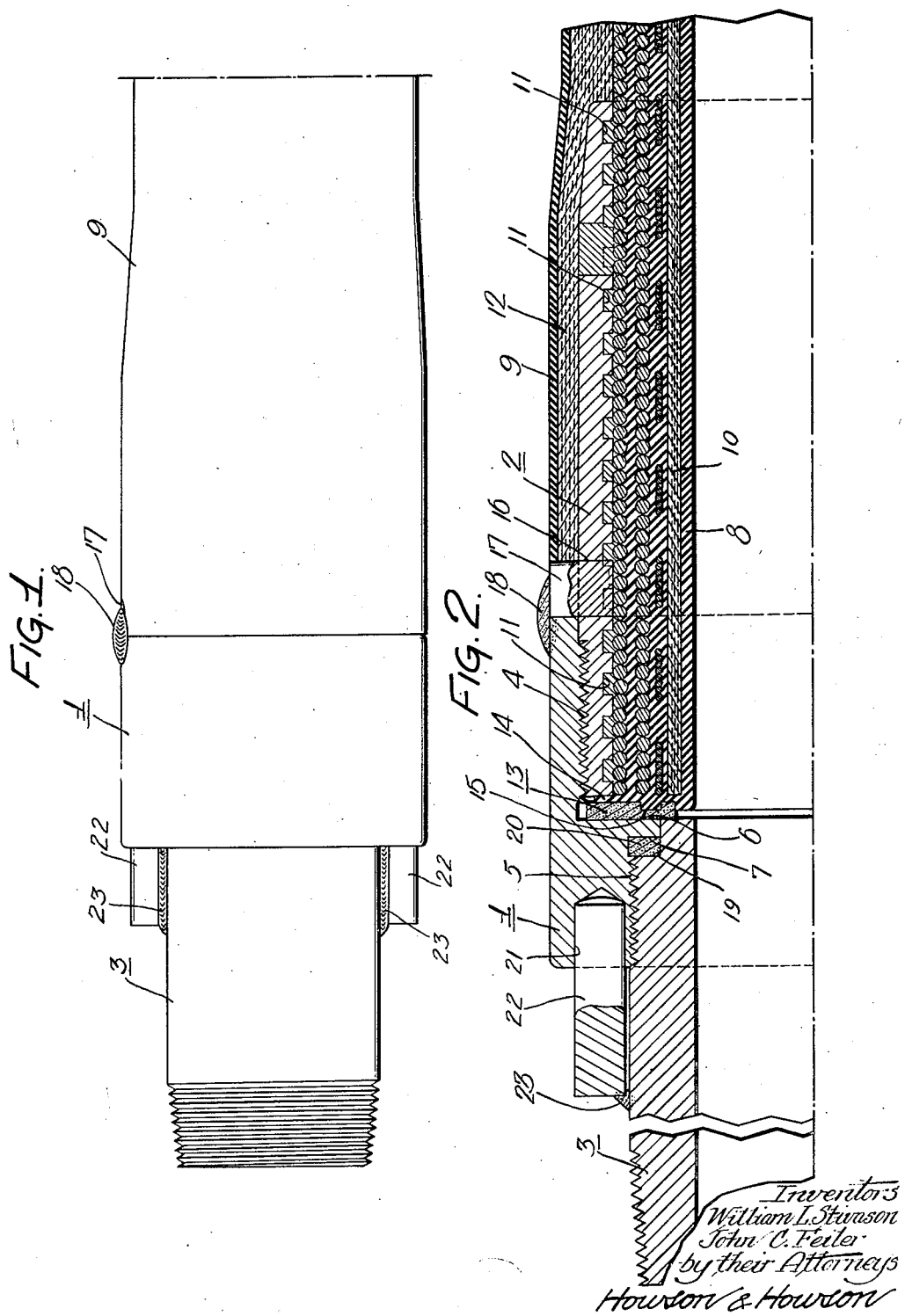

2,506,494

UNITED STATES PATENT OFFICE 2,506,494

COUPLING ASSEMBLY FOR ROTARY DRILL HOSE

John C. Feiler, Trenton, and William L. Stivason, Hamilton Square, N. J., assignors to The Whitehead Brothers Rubber Company, Trenton, N. J., a corporation of New Jersey Application January 9, 1948, Serial No. 1,315

8 Claims. (Cl. 285—72)

This invention relates to couplings for rotary drill hose and a primary object of the invention is to provide an improved coupling assembly of this class.

More specifically, an object of the invention is to provide a coupling assembly wherein the component elements are united in a manner precluding separation thereof, and in a manner also to insure a positive fluid-tight sealing of the joints.

The invention resides further in certain structural details hereinafter described and illustrated in the attached drawings, wherein:

Fig. 1 is a side view of a coupling assembly made in accordance with the invention, and Fig. 2 is a longitudinal sectional view of the assembly.

With reference to the drawings, the assembly comprises three primary members consisting respectively of a head member 1, a sleeve 2 and a nipple 3. The head member 1, of generally tubular form, has at one end a threaded counterbore 4 of relatively large diameter which in assembly receives the externally threaded end of the sleeve 2. At the other end, the head member has a threaded counterbore 5 of lesser diameter which in assembly receives the externally threaded end of the nipple 3. The counterbores 4 and 5 terminate at their inner ends in inturned shoulders, 6 and 7 respectively, in the head member 1.

The sleeve 2 is adapted to be attached in integral manner to the end of the hose body. In accordance with conventional practice the hose is composed of an inner rubber tube 8, an outer rubber cover 9, a carcass 10 which adjoins the rubber tube 8 and consists usually of superimposed plies of fabric bonded together by a suitable rubber compound and vulcanized to the said tube 8, and a plurality of intermediate layers of rubber or rubberized material and metallic reenforcing elements in the form of spirally wound wires of various gauge, as illustrated in Fig. 2. The sleeve 2 is embedded in this composite hose body as illustrated and, conventionally, is incorporated in the structure of the hose by means of a pour of molten metal received in annular recesses 11 in the inner surface of the sleeve which metal when solidified integrally bonds the steel sleeve to the metallic reenforcing elements of the hose. Externally the hose is built up over the major length of the sleeve by successive layers of rubberized fabric as indicated at 12 to afford a smooth and streamlined finish to the outside of the hose. Following incorporation of the sleeve in the hose end as described above the hose body is vulcanized to thereby integrally unite the rubber and rubberized elements of the body and to thereby unite the elements of the hose structure into a highly integralized structure.

Except as to certain details hereinafter described the mode of incorporation of the sleeve into the hose body forms no part of the present invention. It is to be noted, however, that the threaded outer end of the sleeve which enters the head member 1 is exposed at the end of the hose and that the outer terminal end of the sleeve lies flush or substantially flush with the terminal end of the hose body which in this area lies entirely within the sleeve.

In accordance with the invention a washer 13, preferably of fiber, is provided at the shoulder 6, said washer in assembly being interposed between said shoulder and the terminal end of the sleeve 2 and of the hose body. It is to be noted that the shoulder 6 is of sufficient width to embrace a major part of the thickness of the wall of the hose at the inner extremity, including the sleeve 2, and the washer 13 is correspondingly wide. As shown in Fig. 2 the inner tube 8 is extended outwardly at the end of the tube in radial direction so as to form in effect a radial flange 14 covering the end surface of the hose body. Preferably, the washer 13 is provided with a recess 15 which, when the sleeve 2 is threaded into the counterbore 4 and is turned down tightly against the washer, receives the resilient material of the flange 14 as illustrated in Fig. 2 to thereby establish a more intimate relation between the contacting surfaces of the washer and the hose structure. By this means a positive fluid-tight seal is formed between the sleeve 2 and associated hose structure on the one hand and the head member 1 on the other hand.

In order to integrally unite the head member 1 to the hose structure the sleeve 2 is apertured at 16 for reception of a pin 17 which neatly fits said aperture and projects outwardly in contiguous relation to the proximate end of the head member 1. This metallic pin 17 is welded by means, for example, of a bridge weld 18 to the head member 1 thereby establishing an integral relationship between the sleeve 2 and the head member.

A somewhat similar device is employed to positively unite the nipple 3 with the head member 1. As shown in Fig. 2 the inner end of the nipple 3 which enters the head member 1 is recessed at 19, and between the bottom of this recess and the confronting surface of the shoulder 7 of the head member is inserted a washer 20 of fiber or similar suitable material which, when the nipple 3 is threaded into place, establishes a positive fluid-tight seal between the nipple and the head member. In accordance with the invention the end of the head member 1 is provided with one or more recesses or apertures 21 (two in the present instance) which extend in the axial direction and are adapted for reception of the end portions of a pair of pins 22, 22 which, after the sleeve has been turned solidly into the head member 1, are welded as at 23 to the outer surface of the nipple 3. By this means the nipple, in effect, is integrally joined to the head member 1. It will be noted that the design is such that the bore of the nipple 3 corresponds in diameter to and forms in effect a continuation of the inner passage of the rubber tube 8 of the hose.

It will be apparent that the aforedescribed construction affords a coupling assembly of the stated class having superior functional and structural characteristics. It is to be understood, however, that the structure may be modified in detail without departure from the principle of the invention as defined in the appended claims.

We claim:

1. In a hose coupling assembly of the character described, the combination with a tubular head member internally threaded at each end and having an inturned shoulder at the inner end of each said thread, of a sleeve integrally attached to an end of the hose body and threaded into one end of said head member, a nipple threaded into the other end of said head member, a washer confined between the respective inner ends of said sleeve and nipple and the said inturned shoulders of the head member proximate thereto, and means integrally uniting said sleeve and nipple with the head member.

2. In a hose coupling assembly of the character described, the combination with a tubular head member internally threaded at each end and having an inturned shoulder at the inner end of each said thread, of a sleeve integrally attached to an end of the hose body and threaded into one end of said head member, a nipple threaded into the other end of said head member, a washer confined between the respective inner ends of said sleeve and nipple and the said inturned shoulders of the head member proximate thereto, and a pin joined integrally to said head member and fitted into an aperture in the wall of said sleeve to thereby unite the sleeve with said member.

3. In a hose coupling assembly of the character described, the combination with a tubular head member internally threaded at each end and having an inturned shoulder at the inner end of each said thread, of a sleeve integrally attached to an end of the hose body and threaded into one end of said head member, a nipple threaded into the other end of said head member, a washer confined between the respective inner ends of said sleeve and nipple and the said inturned shoulders of the head member proximate thereto, and a pin joined integrally to said nipple and fitted into an aperture in the wall of said head member to thereby unite the nipple with said member.

4. A hose coupling assembly comprising a tubular head member, a sleeve member integrally attached to an end of the hose body and threaded into one end of said head member, a nipple member threaded into the other end of the head member, and means for integrally uniting said nipple and sleeve members to the head member, said means comprising in each instance a pin element joined integrally to one of the members of the said united pairs and fitted into an aperture in the wall of the other member of said pairs.

5. A hose coupling assembly according to claim 4 wherein the head member comprises an internal abutment for the inner end of each of the other members.

6. A hose coupling assembly according to claim 5 wherein a washer is confined between each of said abutments and the inner ends of the associated sleeve and nipple member.

7. In a hose coupling assembly, a tubular metallic head member having a threaded counterbore at one end, a sleeve integrally attached to one end of the hose body and threaded into said counterbore, and a metal pin welded to the end of said head member and fitted into an aperture in the wall of said sleeve to thereby integrally join the sleeve to the body.

8. In a hose coupling assembly, a tubular metallic head member having a threaded counterbore at one end, a nipple threaded into said counterbore, and at least one metal pin welded to the outside of said nipple and fitted into an aperture in the proximate end wall of said head member to thereby integrally join the nipple to the body.

JOHN C. FEILER.
WILLIAM L. STIVASON.

REFERENCES CITED

The following references are of record in the file of this patent:

UNITED STATES PATENTS

| Number | Name | Date |
|---|---|---|
| 2,122,126 | Barnard | June 28, 1938 |
| 2,241,926 | Ryan et al. | May 13, 1941 |

FOREIGN PATENTS

| Number | Country | Date |
|---|---|---|
| 539,053 | Great Britain | Aug. 26, 1941 |